(12) United States Patent
Stephens

(10) Patent No.: US 8,661,466 B2
(45) Date of Patent: Feb. 25, 2014

(54) REPRESENTATION OF ONLINE DISCUSSION IN CONJUNCTION WITH PRIMARY VISUAL CONTENT

(75) Inventor: Mark Stephens, West Yorkshire (GB)

(73) Assignee: Eldon Technology Limited, Keighley (GB)

( * ) Notice: Subject to any disclaimer, the term of this patent is extended or adjusted under 35 U.S.C. 154(b) by 179 days.

(21) Appl. No.: 13/117,694

(22) Filed: May 27, 2011

(65) Prior Publication Data

US 2011/0292283 A1 Dec. 1, 2011

Related U.S. Application Data

(60) Provisional application No. 61/348,868, filed on May 27, 2010.

(51) Int. Cl.
*H04N 7/10* (2006.01)
*H04N 7/025* (2006.01)

(52) U.S. Cl.
USPC .................................. 725/34; 725/44; 725/50

(58) Field of Classification Search
USPC .......................................... 725/32, 34, 44, 50
See application file for complete search history.

(56) References Cited

U.S. PATENT DOCUMENTS

| 6,754,904 B1* | 6/2004 | Cooper et al. | 725/32 |
| 8,032,443 B2* | 10/2011 | Everaert et al. | 705/37 |
| 8,400,417 B2* | 3/2013 | Ording et al. | 345/173 |
| 2009/0063991 A1* | 3/2009 | Baron et al. | 715/751 |

\* cited by examiner

*Primary Examiner* — Hunter B Lonsberry
(74) *Attorney, Agent, or Firm* — Lowe Graham Jones PLLC

(57) ABSTRACT

A method of representing online discussions in conjunction with primary visual content is presented. In the method, the primary visual content is transmitted to a visual display for presentation to a user. A statement of an online discussion is received. In response to receiving the statement, a representation of the statement and an icon representing a source of the statement are transmitted in conjunction with the primary visual content for presentation on the visual display. The icon and the statement are coupled graphically on the visual display, and are placed near a periphery of the visual display. After a period of time while the icon and statement are presented on the display, presuming a second statement is not received from the source, the icon and the statement are removed from the display while the primary visual content is maintained on the display.

19 Claims, 9 Drawing Sheets

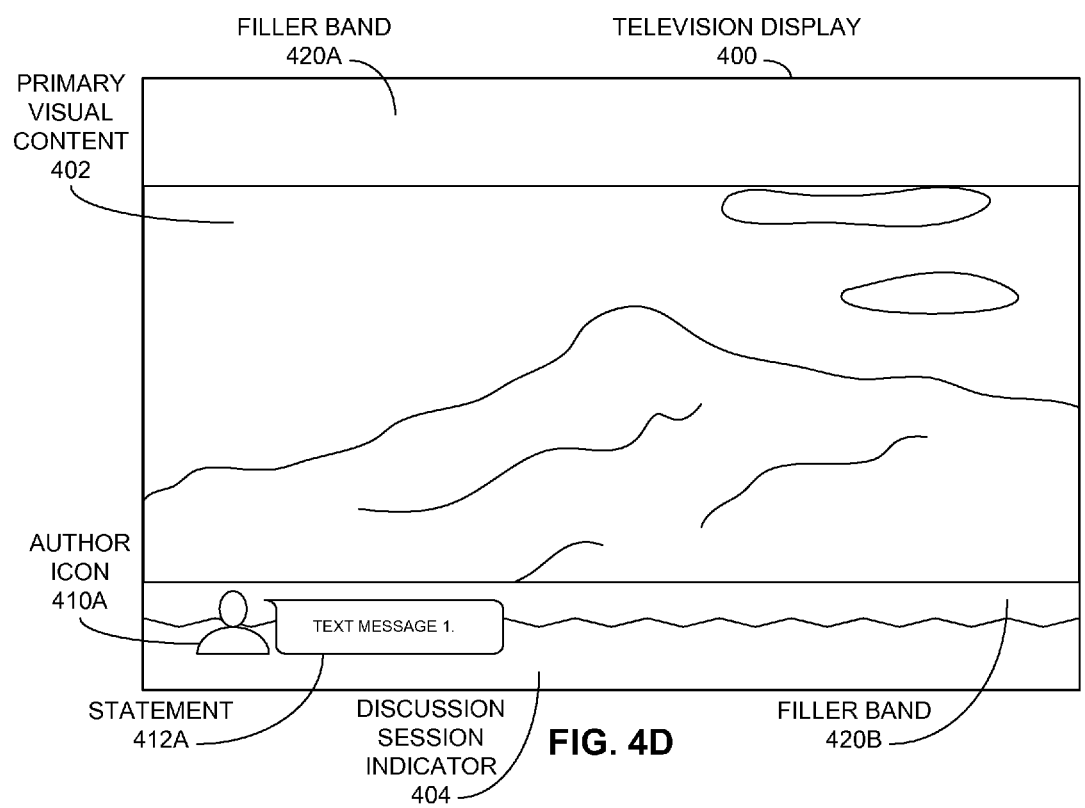

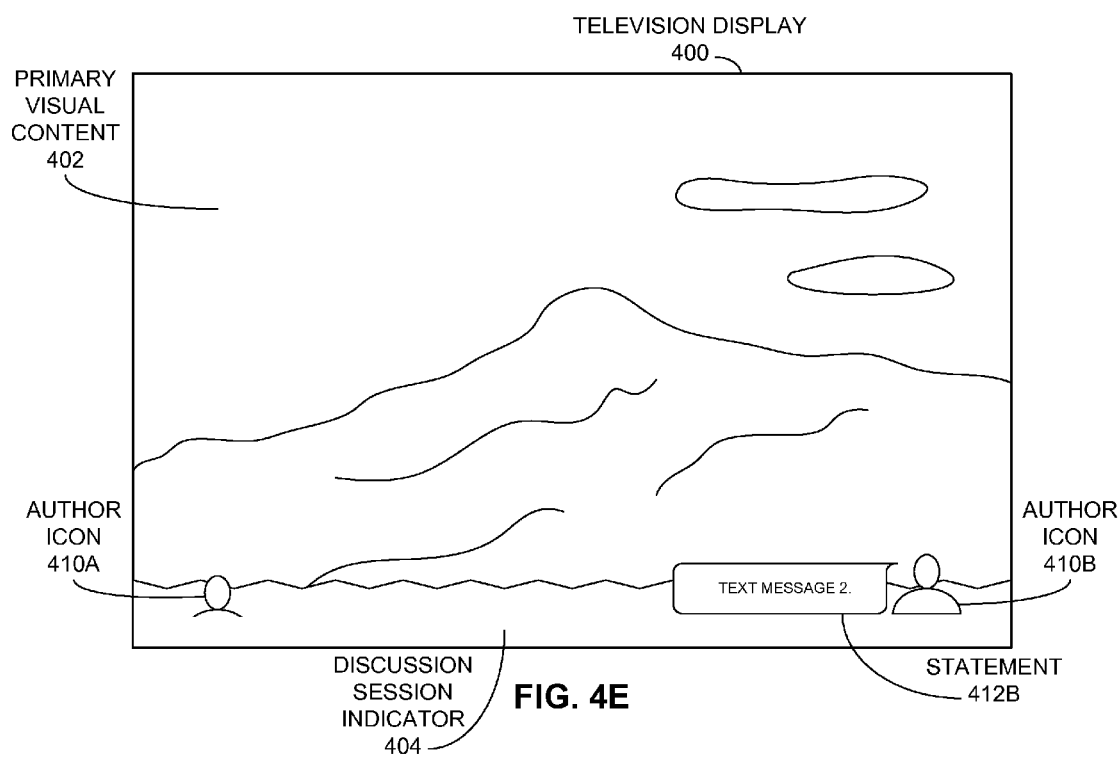

REPRESENTATION OF ONLINE DISCUSSION IN CONJUNCTION WITH PRIMARY VISUAL CONTENT

PRIORITY CLAIM

This application claims the benefit of and priority to co-pending U.S. utility application entitled, "Representation of Online Discussion in Conjunction with Primary Visual Content," having application Ser. No. 61/348,868, filed May 27, 2010, and which is entirely incorporated herein by reference.

BACKGROUND

Among the many innovations resulting directly from the continuing evolution of the Internet is the development of websites hosting real-time discussions among users located in separate geographic areas. Ordinarily, such an online discussion site, or "chat room", provides a graphical interface in which a scrolling list of messages and associated authors, indicating the temporal order and logical interrelationship of the messages, is displayed on a computer screen. In more advanced online discussion interfaces, each author may be represented by a graphical icon or "avatar", and may include one or more speech "bubbles" visually coupled with the avatar to associate the text of each message with the appropriate author. Moreover, some online role-playing game sites employ avatars, speech bubbles, and the like to facilitate discussion between game characters. In both the chat site and gaming site realms, the online discussion plays a central role, and thus arguably represents the primary focus of the site.

BRIEF DESCRIPTION OF THE DRAWINGS

Many aspects of the present disclosure may be better understood with reference to the following drawings. The components in the drawings are not necessarily depicted to scale, as emphasis is instead placed upon clear illustration of the principles of the disclosure. Moreover, in the drawings, like reference numerals designate corresponding parts throughout the several views. Also, while several embodiments are described in connection with these drawings, the disclosure is not limited to the embodiments disclosed herein. On the contrary, the intent is to cover all alternatives, modifications, and equivalents.

FIGS. 4A through 4E are graphical representations of a television display depicting an online discussion session according to an embodiment of the invention.

DETAILED DESCRIPTION

The enclosed drawings and the following description depict specific embodiments of the invention to teach those skilled in the art how to make and use the best mode of the invention. For the purpose of teaching inventive principles, some conventional aspects have been simplified or omitted. Those skilled in the art will appreciate variations of these embodiments that fall within the scope of the invention. Those skilled in the art will also appreciate that the features described below can be combined in various ways to form multiple embodiments of the invention. As a result, the invention is not limited to the specific embodiments described below, but only by the claims and their equivalents.

Figure 1:
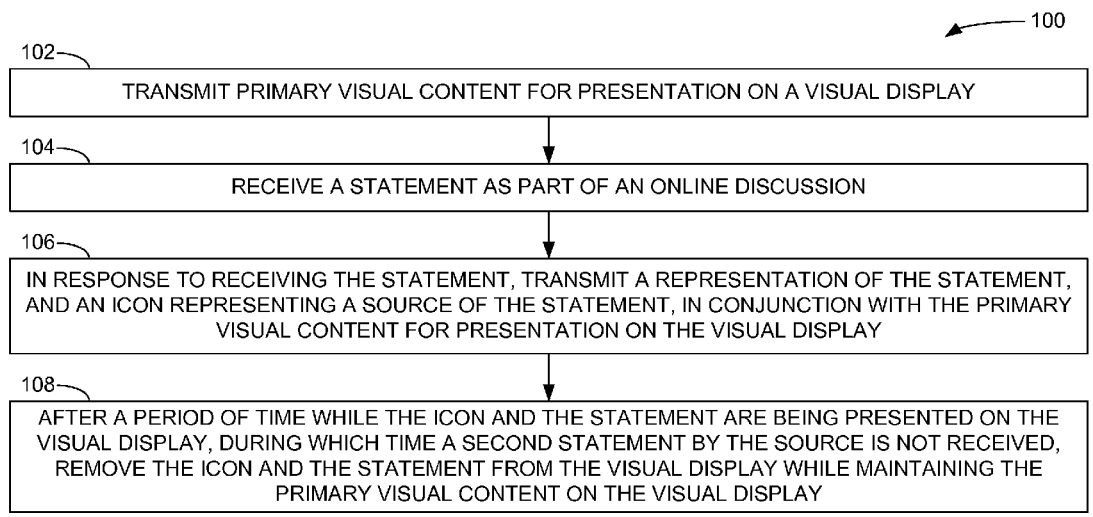
FIG. 1 is a flow diagram of a method according to an embodiment of the invention of representing online discussions in conjunction with primary visual content.

FIG. 1 presents a method 100 of representing online discussion or chat sessions in conjunction with primary visual content. As described in greater detail below, primary visual content may be any visual or video content to be presented to a user, such as a televised news program, sporting event, movie, weekly episodic program, and so on. However, other types of primary visual content, including, but not limited to, still images and static documents, may also serve as primary visual content in other implementations. Further, an online discussion being represented with the primary visual content involves two or more sources or parties to the discussion. Additionally, the discussion may address or pertain to any subject or topic, including, but not limited to, the primary visual content with which the discussion is being presented.

In the method 100 of FIG. 1, primary visual content is transmitted for presentation on a visual display (operation 102), such as a television or video monitor. A statement representing part of an online discussion is received (operation 104). In response to receiving the statement, a representation of the statement, as well as an icon representing a source of the statement, is transmitted in conjunction with the primary visual content for presentation on the visual display (operation 106). In at least some embodiments, the icon and the statement are coupled graphically on the display, and are placed near an edge or periphery of the display. After a period of time while the icon and the statement are being presented on the display, presuming a second statement by the source is not received during that time, the icon and the statement are removed from the visual display while maintaining the primary visual content on the display (operation 108).

While the operations of FIG. 1 are depicted as being executed in a particular order, other orders of execution, including concurrent or overlapping execution of two or more operations, may be possible. In another embodiment, a computer-readable storage medium may have encoded thereon instructions for a processor or other control circuitry of an electronic device, such as a television receiver or set-top box, to implement the method 100.

As a result of employing the method 100, information involving an online discussion is presented near the periphery of a display, and remains on the display for a limited amount of time. Thus, a user engaging in the online discussion may carry on the discussion without significantly detracting from the consumption or enjoyment of the primary visual content being presented on the same visual display. Additional advantages may be recognized from the various implementations of the invention discussed in greater detail below.

Figure 2:
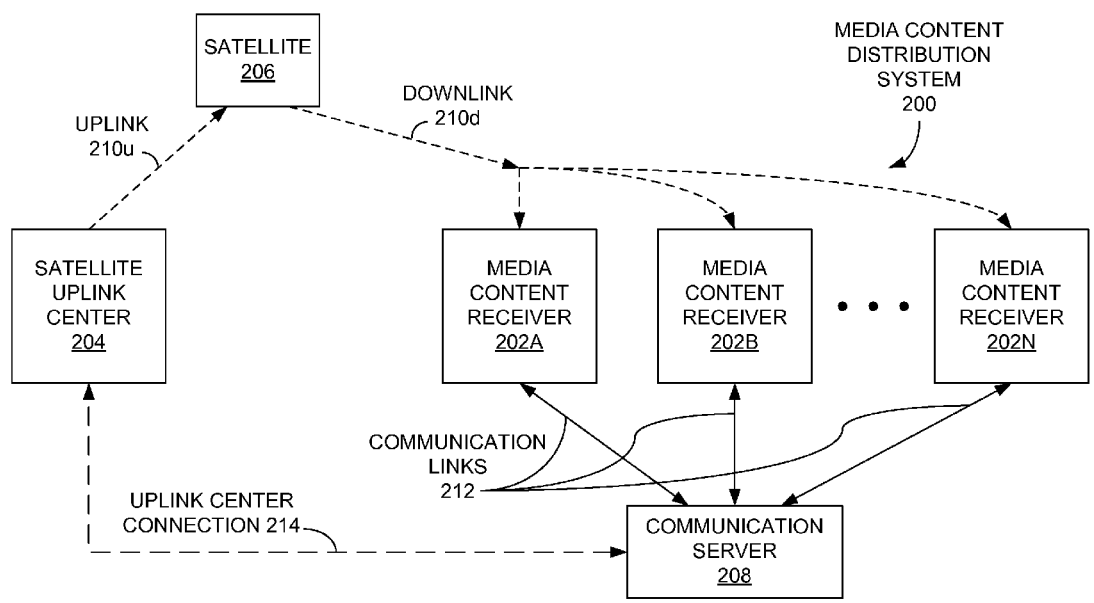
FIG. 2 is a simplified block diagram of a media content distribution system according to an embodiment of the invention.

FIG. 2 is a simplified block diagram of a media content distribution system 200 according to an embodiment of the invention. In this particular example, the system 200 is a satellite television broadcast system, although other types of content distribution systems, such as cable and terrestrial ("over-the-air") television broadcast systems, may also incorporate some or all of the various inventive concepts described hereinafter. In yet other implementations, the media content distribution system 200 may be a computer-based local-area network (LAN) or wide-area network (WAN), such as the Internet.

In the system of FIG. 2, a satellite uplink center 204 provides broadcast television programming, possible along with audio programming, interactive television programming, and so on, to one or more satellites 206 by way of at least one communication channel of an uplink 210u. The uplink 210u may also carry metadata, such as electronic program guide (EPG) data, firmware upgrades, and other information. The satellite uplink center 204 may receive this programming and associated information from other sources, such as television networks, independent television channels, EPG data services, and the like, and may generate at least some of the programming or information internally. Any of the programming transmitted to the satellite 206 may serve as primary visual content for ultimate presentation to a user.

The satellite 206 employs at least one signal transponder (not shown in FIG. 2) to receive the various channels of programming and related information on the uplink 210, and retransmit the information via a downlink 210d to multiple media content receivers 202A, 202B, ..., 202N. The media content receivers 202 are described with greater particularity below in conjunction with FIG. 3. Within the environment of FIG. 2, the media content receivers 202 are satellite television set-top boxes 202, each of which is configured to receive the data on the downlink 210d via a parabolic antenna and a low-noise block-converter (LNB) attached thereto. Each of the media content receivers 202 is configured to process and transfer the received programming and associated information for one or more televisions (not depicted in FIG. 2) for presentation to a user. In other implementations, the media content receiver 202 may be incorporated within the television or other visual display device to which the receiver 202 is connected.

To facilitate online discussions between users of the various media content receivers 202, each of the receivers 202 is coupled to a communication server 208 by way of communication links 212. Each of the communication links 212 may be implemented by way of Internet connection, telephone connection, or other communication means. Each of the receivers 202 may transmit and receive messages initiated by a user of the receiver 202 for online discussions with users of other receivers 202. Each of the messages may include the identity of one or more destination receivers 202, users of such a receiver 202, specific online discussion sessions, or the like. The communication server 208 may then receive such messages, determine the one or more destination receivers 202 for each of the messages based on the destination information accompanying the message, and transmit the messages accordingly.

In one implementation, the communication server 208 may also be coupled via an uplink center connection 214 to the uplink center 204. Such a connection 214 may be beneficial in cases in which information provided during the online discussion may be employed to affect the processing and transmission of the programming to be received at the receivers 202 via the satellite 206 from the uplink center 204.

Figure 3:
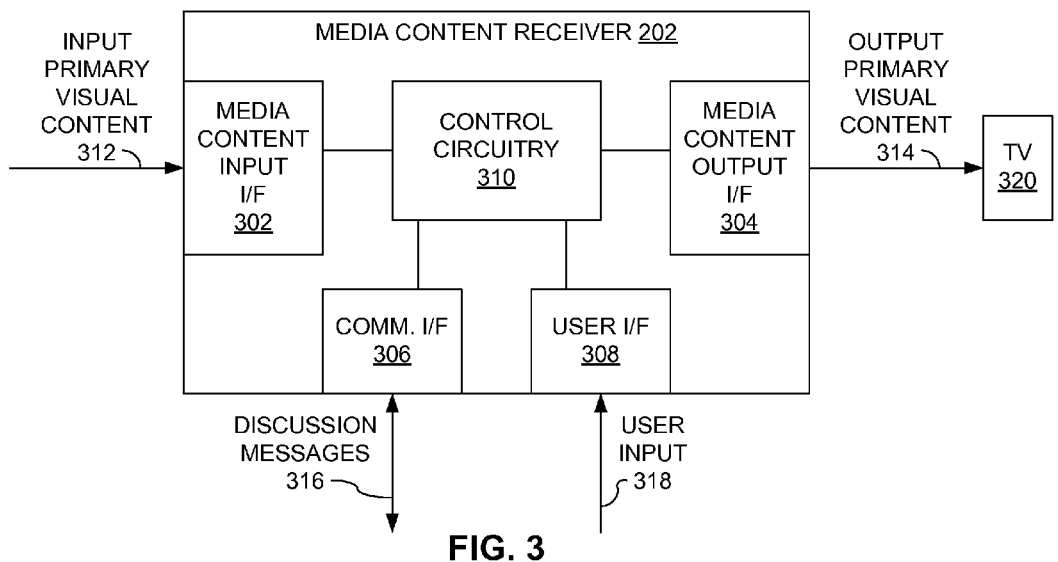
FIG. 3 is a block diagram of a media content receiver as employed in the media content distribution system of FIG. 2 according to an embodiment of the invention.

A possible example of the media content receiver 202 of FIG. 2 is illustrated in greater detail in FIG. 3. In this case, the receiver 202 includes a media content input interface 302, a media content output interface 304, a communication interface 306, a user interface 308, and control circuitry 310 coupled to the remaining components 302-308 of the receiver 202. Other components, such as a power supply, an integrated digital video recorder (DVR) unit, a "smart card" interface, and so forth, may also be included in the receiver 202, but such components are not described further herein to simplify the following discussion.

The media content input interface 302 receives input primary visual content 312, such as television programming, from a content source. In the specific example of a satellite television receiver 202, the media content input interface 302 receives the input primary visual content 312 via an antenna/LNB combination, as discussed earlier, which receives, down-converts, and forwards the signal to the media content input interface 302, typically via a coaxial cable. The media content input interface 302 may include one or more tuners for selecting particular programming channels of the incoming content 312 for forwarding to the television 320. The media content input interface 302 may also perform any decryption, decoding, and similar processing of the received content 312 required to place the content 312 in a format usable by the media content output interface 304. In one example, such a format may be one of the Motion Picture Experts Group (MPEG) formats, such as MPEG-2 or MPEG-4, although other media content format standards may be utilized in other embodiments.

In other implementations, the design and configuration of the media content input interface 302 may depend on the nature of the receiver 202. In the case of the receiver 202 being a cable set-top box, the media content input interface 302 may be configured to receive television programming from a cable head-end. If, instead, the receiver 202 is a terrestrial television receiver, the media content input interface 302 may receive the input primary visual content 312 via a terrestrial antenna receiving television signals "over the air". In another example, in which the receiver 202 is a desktop or laptop computer, or even a cellular phone, the media content input interface 302 is configured to receive the input primary visual content 312 over a LAN, a WAN, a cellular communication network, or any other communication network capable of delivering the content 312 to the receiver 202.

The media content output interface 304 provides the selected and processed primary visual content 312 as output primary visual content 314 to the television 320 of FIG. 3. To that end, the media content output interface 304 may encode the selected television content in accordance with one or more television output formats. For example, the media content output interface 304 may format the content for one or more of a composite or component video connection with associated audio connection, a modulated radio frequency (RF) connection, and a High Definition Multimedia Interface (HDMI) connection.

Continuing with FIG. 3, the communication interface 306 is configured to transmit and receive discussion messages 316 for an online discussion session. Each message 316 may include a simple text statement, possibly along with an identification one or more of the source media content receiver 202 for the message 316, the destination media content receiver 202, and the particular online discussion session to which the statement belongs. In some embodiments, the message 316 may also include control characters to provide different fonts for the text, as well as special effects, including underlining, bolding, italicizing, and the like. In more advanced implementations, the message 316 may include additional information, such as uniform resource locators (URLs) for accessing web pages of interest. The communication interface 306 may employ any of a number of communication technologies to send and receive the discussion messages 316, including both wired and wireless varieties. For example, the communication interface 306 may be an Ethernet, Wi-Fi (IEEE 802.11x), or Bluetooth® interface for connecting with an Internet gateway device for communicating with the communication server 208 over the Internet.

In some implementations, the communication interface 306 may send and receive the discussion messages 316 over the same medium employed by the media content input interface 302. For example, if the media content receiver 202 is a cable television set-top box, the communication interface 306 may transmit and receive the messages 316 over the same coaxial cable employed to receive television programming.

To allow the user of the media content receiver 202 to engage in an online discussion, the user interface 308 may facilitate the entry of text and related control characters by way of user input 318. In many examples, the user interface 308 may be a remote control interface configured to receive such input, along with other commands for controlling the media content receiver 202, by way of infrared (IR), radio frequency (RF), acoustic, or other wireless signal technologies. To facilitate such information entry, the receiver 202 may provide a menu system presented to the user via the television 320 or video monitor. In some implementations, the user interface 308 may also include any of a keyboard, mouse, and/or other user input device.

The control circuitry 310 is configured to control and/or access other components of the receiver 202, including the media content input interface 302, the media content output interface 304, the communication interface 306, and the user interface 308. The control circuitry 310 may include one or more processors, such as a microprocessor, microcontroller, or digital signal processor (DSP), configured to execute instructions directing the processor to perform the functions discussed more fully hereinafter. The control circuitry 310 may also include memory or data storage adapted to contain such instructions. Such memory may also include data to aid the control circuitry 310 in performing the tasks more particularly described below. In another implementation, the control circuitry 310 may be strictly hardware-based logic, or may include a combination of hardware, firmware, and/or software elements.

In operation, the control circuitry 310 of the media content receiver 202 is configured to receive the input primary visual content 312, facilitate the engagement of a user in an online discussion with users of other receivers 202, and present to the user via the television 320 the output primary visual content 314 in combination with representations of the discussion and its participants in a way that allows the output primary visual content 314 to remain the primary focus of attention. Generally, the representation of the discussion involves graphics of statements and their associated authors, with the graphics placed on areas of the television 320 display that are less likely to detract from the output primary visual content 314, and then remaining on the display for a limited period of time.

The output primary visual content 314 may be a broadcast program that is being viewed by users of two different media content receivers 202 so that the users may discuss the program. In another example, the output primary visual content 314 may be a video-on-demand (VOD) program being transmitted from the uplink center 204 via the uplink 210u, satellite 206, and the downlink 210d to at least two different receivers 202. In this scenario, playback of the VOD program may be synchronized at the receivers 202 via control signals or messages between the receivers 202 and the communication server 208. Further, to request the VOD program, a request signal or message from one of the receivers 202 may be passed through the communication server 208 via the uplink center connection 214 to the uplink center 204 to indicate that the program is to be passed to multiple receivers 202 involved in the same online discussion.

Figure 4A:
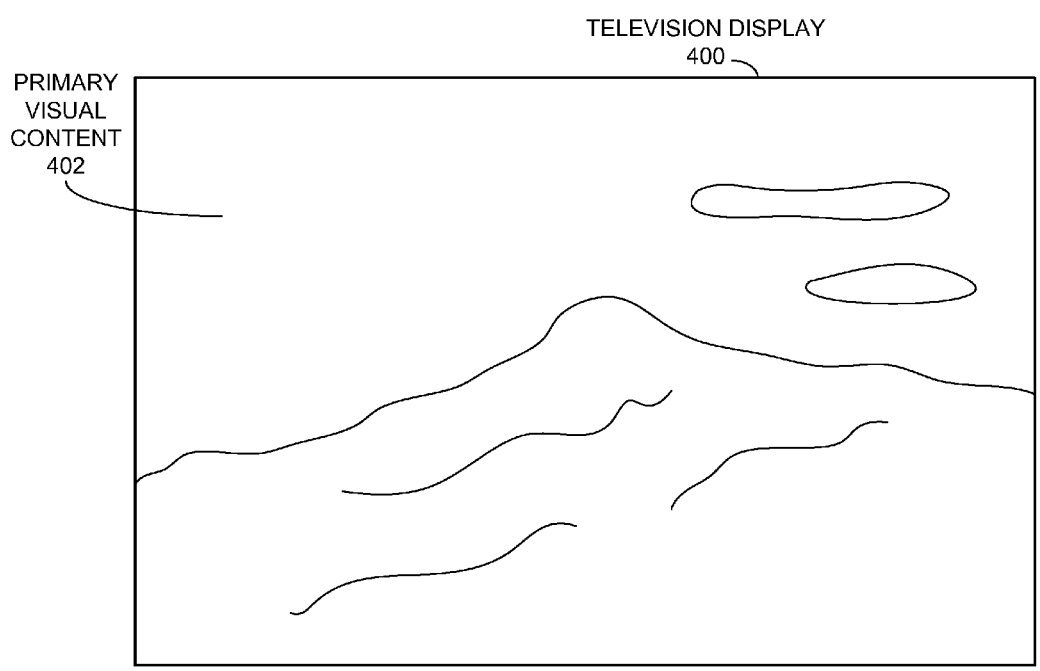

FIGS. 4A-4E are graphical representations of a television display 400 according to a particular embodiment of the invention. FIG. 4A provides a view of primary visual content 402 (in this case, a view of a mountain and surrounding sky) prior to the initiation of an online discussion session. As shown, the primary visual content 402 occupies the entire television display 400. In other situations, such as when the aspect ratio of the content 402 does not match the aspect ratio of the display 400, filler bands may be positioned along any of the four edges (top, bottom, left, and right) of the display 400.

Figure 4B:
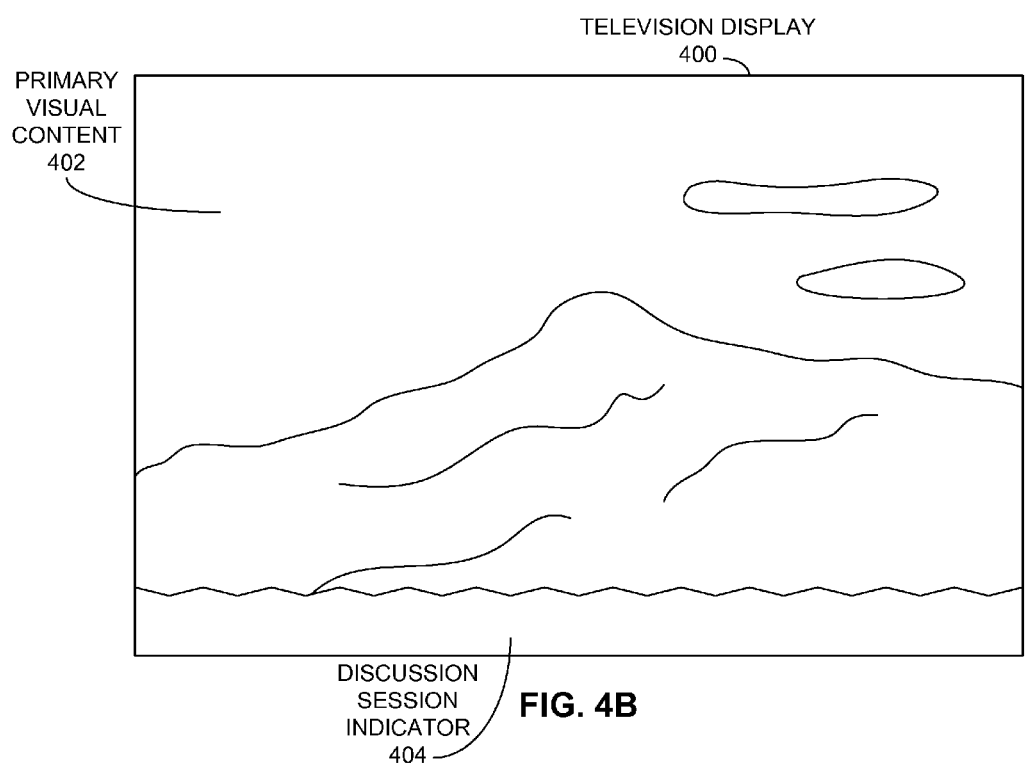

FIG. 4B exemplifies a potential view of the television display 400 after an online discussion session has been initiated. In this example, to indicate that a discussion is active, a discussion session indicator 404 taking the form of a low-profile scenery silhouette, is added along the bottom periphery of the television display 400. As a result, little of the primary visual content 402 is impacted. In other examples, the discussion session indicator 404 may reside along any of the other edges of the television display 400. Alternately, the discussion session indicator 404 may be a small icon or other graphic located in a corner or along an edge of the display 400.

Initiation of an online discussion session may occur in several ways. For one, initiation may be caused by a specific act by the user of the receiver 202 or the user of another receiver 202 prior to sending any messages or statements as part of the discussion. More specifically, a user of a receiver 202 may send a message 316 specifically requesting a user of another receiver 202 to join a discussion session. If the receiving user responds affirmatively by way of another message 316, both receivers 202 may then enter the online discussion session. In another example, a user may initiate the discussion by transmitting a statement or message 316 to another user, with the sending and receiving users automatically being placed into the same online discussion session. In this latter implementation, the control circuitry 310 may not cause a discussion session indicator 404 to be displayed, but instead provide representations of the discussion participants and corresponding statements without the use of the session indicator 404.

Figure 4C:
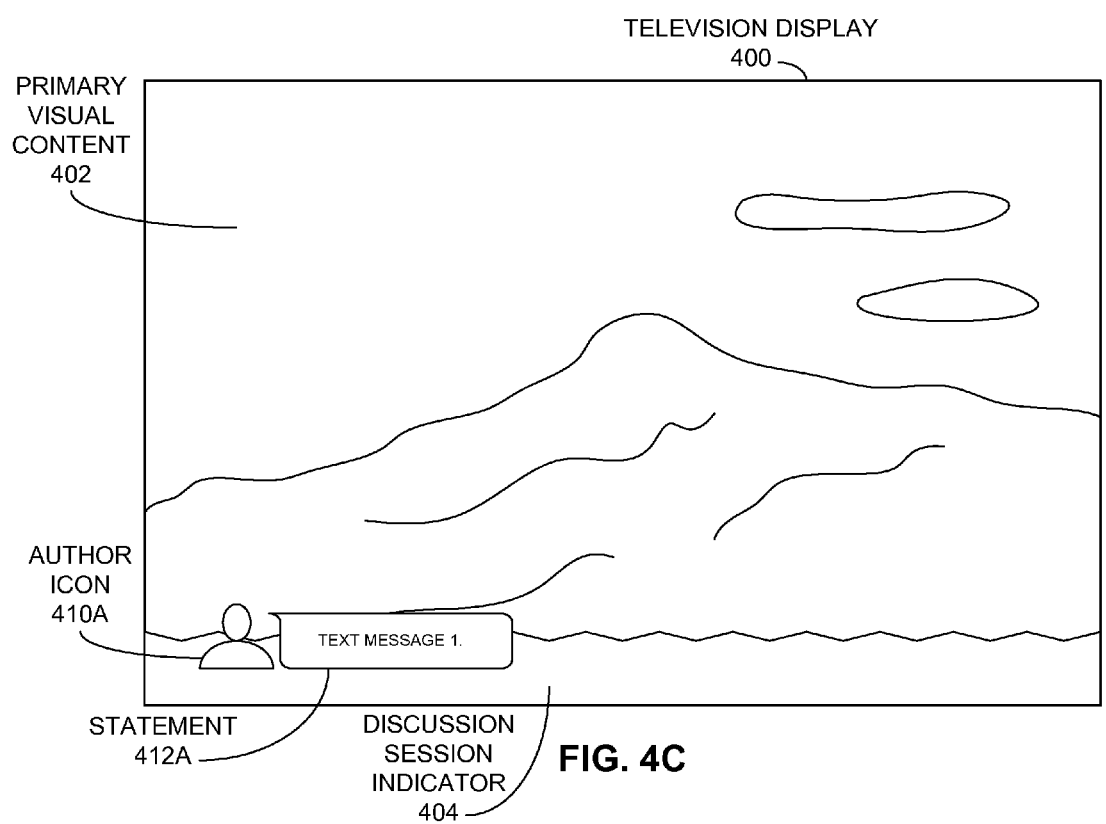

FIG. 4C depicts an icon 410A or avatar for a particular author graphically related to a statement 412A of the author. In the specific case of FIG. 4C, the statement 412A is illustrated as a speech "bubble" emanating from near the icon 410A to specifically indicate the author of the statement 412A, although other ways of relating the icon to its specific statement may be utilized. Further, the icon 410A may appear to arise from the discussion session indicator 404, possibly along with the statement 412A, as opposed to appearing abruptly at the position shown in FIG. 4C. As with the session indicator 404, the icon 410A and the statement 412A reside near a bottom periphery of the display 400, although other locations along the top or sides of the display 400 may be utilized to maintain the center of the primary visual content 402 free from obstruction.

In addition to the various types of information noted above, a message 316 carrying the statement 412A to the receiver 202 for presentation on the television display 400 may include a description of graphics embodied in the icon 410A so that the control circuitry 310 of the receiver 202 may use that data to generate the icon 410A on the display 400. In other embodiments, the data describing the icon 410A may be transmitted upon initiation of the online discussion session in a separate message from the communication server 208.

In another embodiment presented in FIG. 4D, the aspect ratio of the primary visual content 402 does not match the aspect ratio of the television display 400. In this specific example, the content 402 does not fill the top and bottom areas of the television display 400, thus causing the presence of a top filler band 420A and a bottom filler band 420B. Thus, as shown in FIG. 4D, the author icon 410A and associated statement 412A, along with the discussion session indicator 404, may reside completely within the bottom filler band 420B, thereby eliminating any possible overlap between the discussion-related graphics 404, 410A, 412A and the primary visual content 402. Alternately, the top filler band 420A may be employed to display the discussion graphics 404, 410A, 412A in a similar manner.

In yet other arrangements, the primary visual content may be of an aspect ratio that causes one or two side filler bands on the television display 400, thus creating room along either the left an/or right edges of the display 400 in which to locate the discussion graphics 404, 410A, 412A.

According to another implementation in which the aspect ratios of the display 400 and the primary visual content 402 are not equal, the control circuitry 310 may possess the capability to position the primary visual content 402 toward the top or bottom (in the case shown in FIG. 4D), or to the left or right (in the case side filler bands are created) when an online discussion session is initiated. Such repositioning of the content 402 on the display 400 may generate a larger contiguous filler band along one edge of the display 400 to be used for presentation of the discussion graphics 404, 410A, 412A. The termination of an ongoing discussion session may thus result in the control circuitry 310 re-centering the primary visual content to generate two equally-sized filler bands.

In yet another configuration, the user may desire the aspect ratio of the primary visual content 402 to be altered so that at least one filler band results, so that the discussion graphics 404, 410A, 412A may be placed therein. For example, the height of the content 402 may be reduced to produce a bottom filler band 420B, as shown in FIG. 4D, even though the original aspect ratio of the content 402 matches the aspect ratio of the television display 400.

At the time the icon 410A and statement 412A are first represented on the television display 400, the control circuitry 310 may initiate a timer tracking how long the statement 412A has been displayed. If the statement 412A has been displayed for some predetermined period of time, and no new statements from the source of the displayed statement 412A (i.e., the author represented by the icon 410A), the statement 412A, possibly along with the icon 410A, may be removed from the display 400. In one implementation, the icon 410A and the statement 412A may "sink" into the discussion session indicator 404 to eliminate any overlap between the primary visual content 402 and the graphics 410A, 412A associated with the discussion. In another example, the icon 410A and the statement 412A may be removed abruptly from the display 400A without any relocation toward the session indicator 404. In another embodiment, the statement 412A may be removed upon expiration of the timer, while the author icon 410A is maintained on the display 400 for some additionally period of time before being removed. FIG. 4E, described in greater detail below, exemplifies the case in which the statement 412A has been removed completely, and the icon 410A is in the process of retreating into the discussion session indicator 404.

If, instead, a new statement from the same author represented by the icon 410A is received at the receiver 202 prior to removal of the first statement 412A, the control circuitry 310 may simply replace the first statement 412A with the newer statement in the speech bubble. In some cases, the control circuitry 310 may desire to alert the user that the text currently displayed is a new statement, rather than the first statement 412A. To address this desire, the control circuitry 310 may be configured to darken or "fade" the first statement 412A so that if a new statement is received, the new statement may be displayed at an original level of brightness. Such a change in brightness from the first statement 412A to the second may provide a significant cue to the user that a new statement is being presented on the display 400. In another example, the control circuitry 310 may employ flashing or some other graphical technique to alert the user of the receiver 202 to the presentation of the most recent statement. In yet another example, a new speech bubble for the new statement may temporarily and partially overlap the speech bubble of the first statement 412A before the first statement 412A and associated bubble are removed.

A statement 412B from a second author may be received during the discussion for presentation to the user of the receiver 202. FIG. 4E represents such a situation. In this particular example, the statement 412B is displayed in association with an author icon 410B representing the second author. Both the second icon 410B and the statement 412B are located along the bottom periphery of the television display 400 to avoid overlap with a central portion of the primary visual content 402. Further, the second icon 410B and statement 412B are positioned so as to not overlap or otherwise interfere with any other icons or statements currently being presented on the display 400. As mentioned above, while the second icon 410B and statement 412B are being displayed, the period of time for the first icon 410A and statement 412A has elapsed, causing both the first icon 410A and statement 412A to be removed from the display 400. The same rules for displaying and removing the first icon 410A and statement 412A, as presented above, may also be applied to the second icon 410B and statement 412B.

While the examples above involve two participants in an online discussion, several more authors may participant concurrently, thus implying the potential display of multiple icons 410 and associated statements 412 at any one time. These discussion graphics may be placed at various locations about the periphery of the television display 400 to prevent a central portion of the television display 400 from being overlapped, as well as reduce the possibility that the discussion graphics overlap each other. In one implementation, the control circuitry 310 or the communication server 208 may limit the number of participants in a particular discussion session to ensure that the primary visual content 402 is not greatly affected in an adverse manner. Also, the control circuitry 310 may reduce the size of the icons and related statements as presented on the television display 400 as the number of participants in the discussion increases.

Several people or entities may serve as an author or discussion participant. For example, any user of a receiver 202 coupled with a communication server 208, including multiple users of the same receiver 202, may act as a participant in an online discussion. In some implementations, software executing in at least one of the receivers 202 or the communication server 208 may also be a participant. For example, software in the communication server 208 may act as a host of the online discussion, asking questions of the other participants concerning the primary visual content 420, and evaluating their responses for the purpose of awarding game points or prizes. Such questions may, for example, ask about knowledge concerning events that have already occurred in the current program serving as the primary visual content 420, or predictions about events yet to be shown in the content 420. Many other possibilities concerning the use of software-driven or automated participants exist in other contexts.

Given that some users may possess different tastes regarding how the discussion graphics appear on their respective television displays 400, the control circuitry 310 of the receiver 202 may provide a set of menu items displayable on the television display 400 to allow the user to enter selections via the user interface 308 to modify various aspects of the discussion graphics. Such selections may include, for example, where on the display 400 the icons 410 and statements 412 are to be placed preferentially, how large the icons 410 and statements 412 are to be portrayed, how long the icons 410 and statements 412 are to remain on the display 400, and others.

At least some embodiments as described herein thus allow a user to engage in online discussions by way of a media content receiver with other remotely-located users without detracting appreciably from the primary visual content being presented to the user at the time. Typically, these techniques include placing graphics relaying the discussion in relatively unimportant areas of the display presenting the content, such as at a periphery of the display. Also, the amount of time the discussion graphics occupy any area of the display may be limited. However, in circumstances in which a group of users is viewing primary visual content via the same media content receiver, some of the users may desire to watch the content without any potential distraction resulting from an online discussion.

Figure 5:
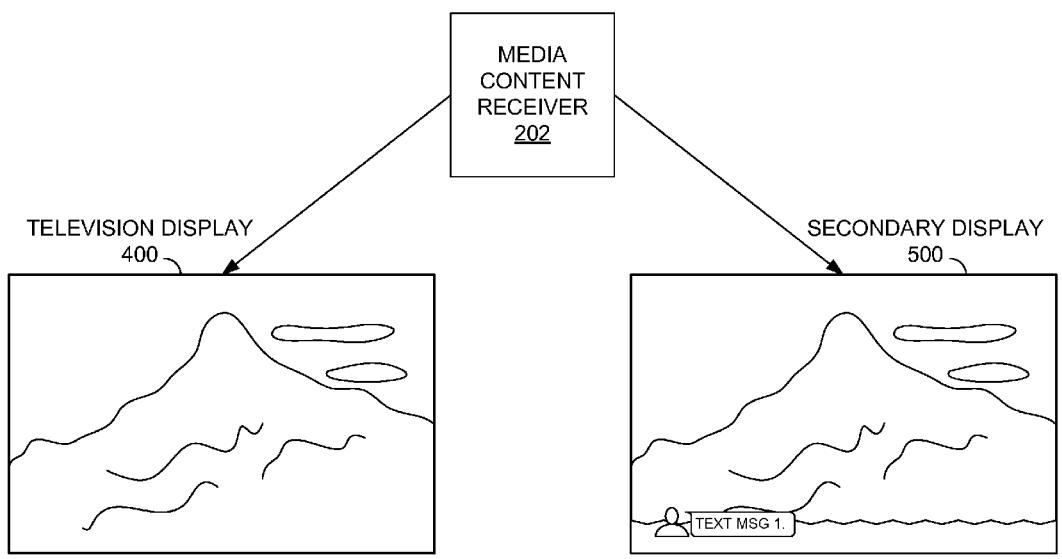
FIG. 5 is a block diagram of a media content receiver coupled to two separate display devices for variable presentation of online discussion information according to an embodiment of the invention.

To address such a concern, a system similar to that shown in FIG. 5 may be employed, in which a single media content receiver 202 may be communicatively coupled to at least two separate displays: a television display 400 for presenting only primary visual content, and a secondary display 500 that may present both the primary visual content and as well as discussion graphics, as shown in FIGS. 4A-4E. In a further embodiment, two or more such secondary displays 500 may be capable of carrying on separate online discussions, all while the main television display 400 strictly presents the primary content without any discussion graphics. As a result, several users, such as members of a family, may enjoy the primary content together in the way each viewer desires. Examples of a secondary display 500 may include, but are not limited to, a laptop or netbook computer, a cellular phone, and a personal digital assistant (PDA), each of which may be coupled by a wired or wireless connection to the receiver 202.

While several embodiments of the invention have been discussed herein, other implementations encompassed by the scope of the invention are possible. For example, while various embodiments have been described largely within the context of a television set-top box, the design of other types of electronic devices, such as cable and terrestrial television set-top boxes, cellular telephones, PDAs, and desktop and laptop computers, that are capable of facilitating online discussions or chats with users of other devices may employ various aspects of the systems and methods described above to similar effect. In addition, aspects of one embodiment disclosed herein may be combined with those of alternative embodiments to create further implementations of the present invention. Thus, while the present invention has been described in the context of specific embodiments, such descriptions are provided for illustration and not limitation. Accordingly, the proper scope of the present invention is delimited only by the following claims and their equivalents.

What is claimed is:

1. A method of representing online discussions in conjunction with primary visual content, the method comprising:
    transmitting the primary visual content for presentation on a visual display;
    receiving a first statement as part of an online discussion;
    in response to receiving the first statement, transmitting a representation of the first statement and an icon representing a source of the first statement in conjunction with the primary visual content for presentation on the visual display;
    sliding the icon onto the visual display via a periphery of the visual display, wherein the icon and the first statement are coupled graphically on the visual display, and wherein the icon and the first statement are placed near the periphery of the visual display after the sliding of the icon onto the visual display ends;
    after a period of time while the icon and the first statement are presented on the visual display, during which a second statement by the source of the first statement is not received, removing the icon and the first statement from the visual display while maintaining the primary visual content on the visual display;
    receiving the second statement of the online discussion from the source of the first statement before expiration of the period of time;
    in response to receiving the second statement, replacing the first statement with the second statement on the visual display, and after a second period of time while the second statement is presented on the visual display; and
    during which a third statement by the source of the first statement is not received removing the icon and the second statement from the visual display while maintaining the primary visual content on the visual display,
    wherein the icon is removed by sliding the icon off of the visual display via the periphery of the visual display, and
    wherein the second statement is faded as the icon is sliding off of the visual display via the periphery of the visual display.

2. The method of claim 1, wherein sliding the icon onto the visual display further comprises:
    sliding the icon onto the visual display via a bottom periphery of the visual display.

3. The method of claim 1, wherein removing the icon and the first statement further comprises:
    sliding the icon off of the visual display via the periphery of the visual display.

4. The method of claim 3, wherein sliding the icon off of the visual display further comprises:
    sliding the icon off of the visual display via a bottom periphery of the visual display.

5. The method of claim 3, wherein removing the icon and the first statement further comprises:
    progressively fading the first statement from the visual display during the period of time as the icon is sliding off of the visual display via the periphery of the visual display.

6. The method of claim 1, wherein the icon is a first icon, and further comprising:
    wherein the second statement of the online discussion is received from a source of the second statement that is not the source of the first statement;
    in response to receiving the second statement, transmitting a representation of the second statement and a second icon representing the source of the second statement in conjunction with the primary visual content for presentation on the visual display, wherein the second icon and the second statement are coupled graphically on the visual display, wherein the second icon and the second statement are placed near the periphery of the visual display, and wherein the first icon and the second icon do not overlap on the visual display; and after the second period of time while the second icon and the second statement are presented on the visual display, during which the third statement by the source of the second statement is not received, removing the second icon and the second statement from the visual display while maintaining the primary visual content on the visual display.

7. The method of claim 1, further comprising:
transmitting a graphical region in conjunction with the primary visual content to indicate the online discussion, wherein the graphical region is located along at least part of the periphery of the visual display.

8. The method of claim 1, wherein:
the source of the first statement is a user of a media content receiver, wherein the media content receiver is configured to connect to the visual display.

9. The method of claim 1, wherein:
the source of the first statement is a user of a media content receiver, wherein the media content receiver is configured to communicatively couple via a communication server with a second media content receiver connected to the visual display.

10. The method of claim 1, wherein:
the source of the first statement is software executing within a communication server communicatively coupled with a media content receiver connected to the visual display.

11. The method of claim 1, wherein transmitting the representation of the first statement and the icon further comprises:
presenting the icon in an area of the visual display unused by the primary visual content.

12. A media content receiver, comprising:
a media content input interface configured to receive primary visual content;
a media content output interface configured to transmit the primary visual content to a visual display for presentation to a user;
a communication interface configured to receive a plurality of statements as part of an online discussion, and an identification of a source of each of the plurality of statements; and
control circuitry configured to:
transmit a representation of a first statement and an icon representing the source of the first statement in conjunction with the primary visual content via the media content output interface for presentation on the visual display, wherein the icon and the first statement are associated graphically on the visual display and are presented by sliding the icon onto the visual display via a periphery of the visual display, and wherein the icon and the first statement are coupled graphically on the visual display and are located outside a central region of the visual display;
after a period of time while the icon and the first statement are first presented on the visual display, during which a second statement by the source of the first statement is not received, remove the icon and the first statement from the visual display while maintaining the primary visual content on the visual display;
receive the second statement of the online discussion from the source of the first statement before expiration of the period of time; and
in response to receiving the second statement, replace the first statement with the second statement on the visual display, and after a second period of time while the second statement is presented on the visual display, during which a third statement by the source of the first statement is not received, removing the icon and the second statement from the visual display while maintaining the primary visual content on the visual display, wherein the icon is removed by sliding the icon off of the visual display via the periphery of the visual display, and wherein the second statement is faded as the icon is sliding off of the visual display via the periphery of the visual display.

13. The media content receiver of claim 12, wherein the control circuitry is further configured to:
in response to receiving the second statement, replace the first statement with the second statement on the visual display, and after the second period of time while the second statement is presented on the visual display, during which the third statement by the source of the first statement is not received, remove the icon and the second statement from the visual display while maintaining the primary visual content on the visual display.

14. The media content receiver of claim 12, wherein:
the media content input interface comprises the communication interface.

15. The media content receiver of claim 12, further comprising:
a user interface configured to receive the second statement of the online discussion from the user of the media content receiver.

16. The media content receiver of claim 15, wherein the icon is a first icon, and wherein the control circuitry is further configured to:
in response to receiving the second statement, transmit a representation of the second statement and a second icon representing the user in conjunction with the primary visual content for presentation on the visual display, wherein the second icon and the second statement are associated graphically on the visual display, wherein the second icon and the second statement are located on the visual display outside the central region of the visual display, and wherein the first icon and the second icon do not overlap on the visual display; and
after the second period of time while the second icon and the second statement are presented on the visual display, during which the third statement by the user is not received via the user interface, remove the second icon and the second statement from the visual display while maintaining the primary visual content on the visual display.

17. A television content receiver, comprising:
a television content input interface configured to receive primary video content;
a television content output interface configured to provide the primary video content to a television display for presentation to a user;
a communication interface configured to receive a plurality of statements in an online discussion, and an identification of a source of each one of the plurality of statements; and
control circuitry configured to:
transmit a representation of a first statement and an icon representing the source of the first statement in combination with the primary video content via the television content output interface to the television display; wherein the icon and the first statement are associated graphically on the television display, wherein the icon is presented by sliding the icon onto the television display via a periphery of the television display, and wherein the icon and the statement are located near the periphery of the television display;

after a period of time while the icon and the first statement are presented on the television display, during which a second statement by the source of the first statement is not received, remove the icon and the first statement from the television display while maintaining the primary video content on the television display, wherein the icon is removed by sliding the icon off of the television display via the periphery of the television display;

receive the second statement of the online discussion from the source of the first statement before expiration of the period of time; and in response to receiving the second statement, replace the first statement with the second statement on the television display, and after a second period of time while the second statement is presented on the television display, during which a third statement by the source of the first statement is not received, removing the icon and the second statement from the television display while maintaining the primary visual content on the television display, wherein the icon is removed by sliding the icon off of the television display via the periphery of the television display, and wherein the second statement is faded as the icon is sliding off of the television display via the periphery of the television display.

18. The television content receiver of claim 17, wherein:
the television content input interface is configured to receive the primary video content from at least one of a satellite, a cable head-end, and a terrestrial antenna;
the communication interface comprises at least one of a telephone connection and a wide-area network connection.

19. The television content receiver of claim 17, wherein the icon is removed by sliding the icon off of the television display via a bottom periphery of the television display.

* * * * *